Feb. 3, 1925.
F. J. ENGLEN
SCALE PLATFORM
Filed June 30, 1919
1,524,970
2 Sheets-Sheet 2
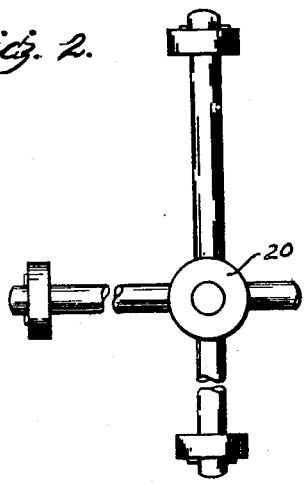
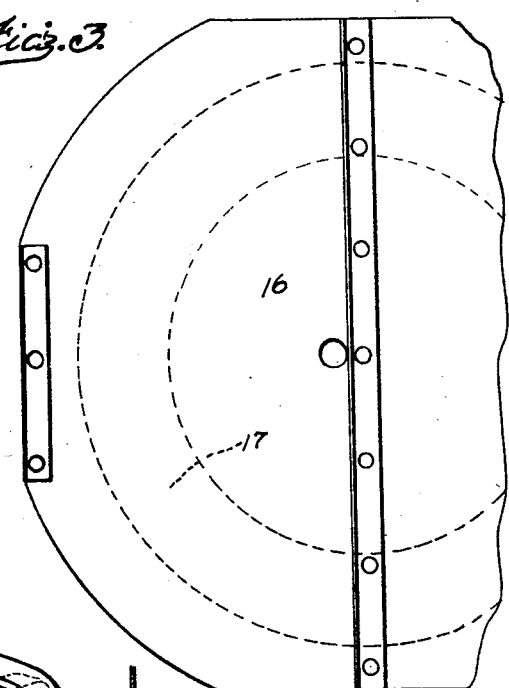
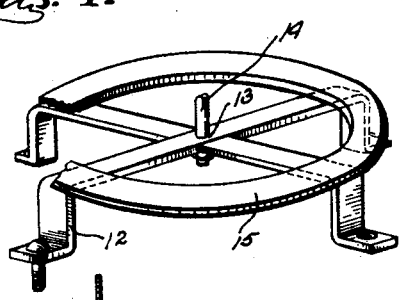
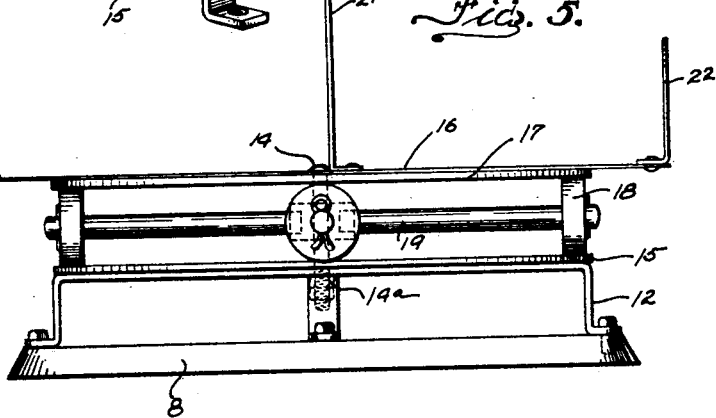
Witnesses
C. E. Wilcox
Frances Doyle
Inventor
Frederick J. Englen
By George R. Frye
Attorney Patented Feb. 3, 1925.

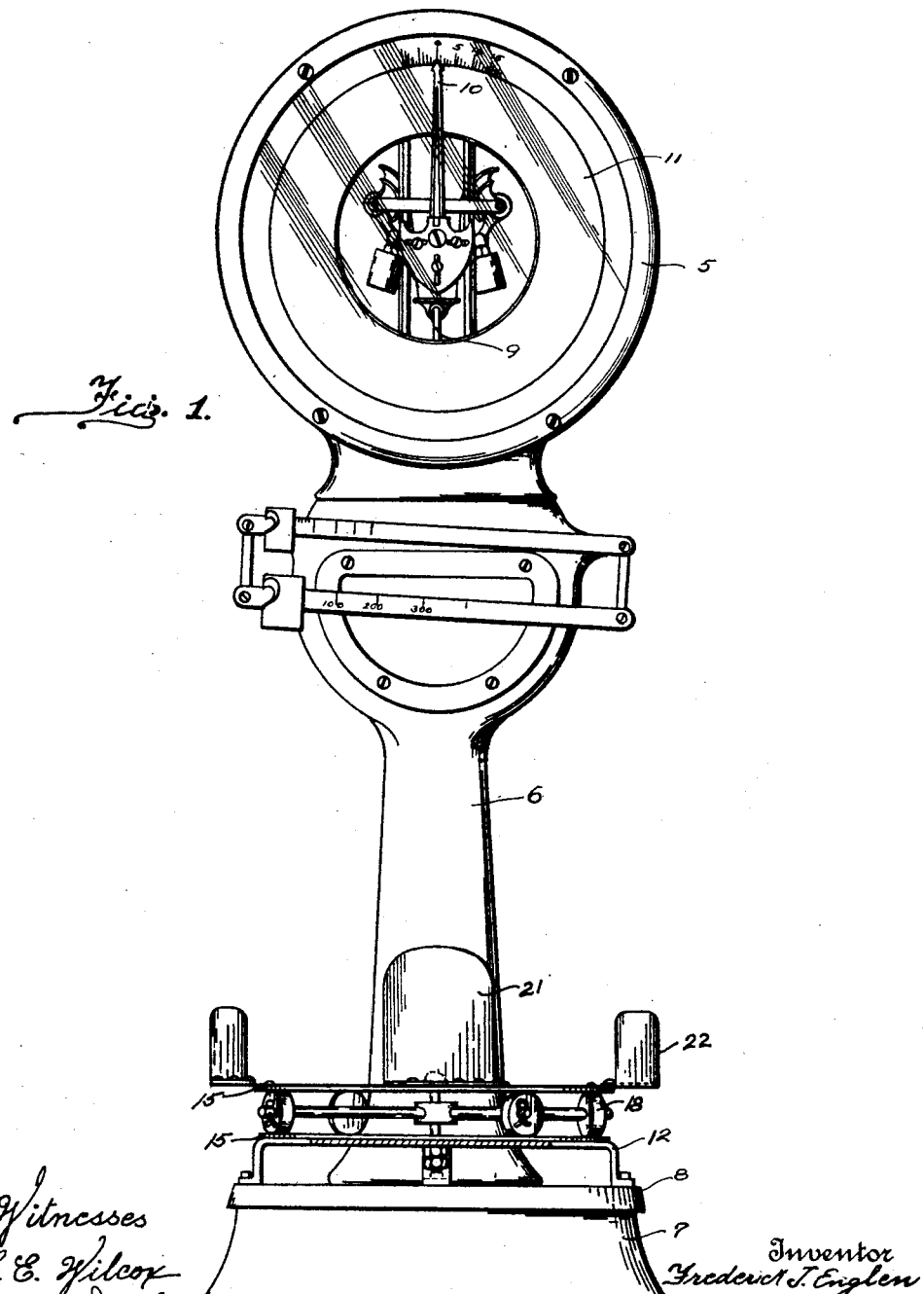

1,524,970

UNITED STATES PATENT OFFICE.

FREDERICK J. ENGLEN, OF OMAHA, NEBRASKA, ASSIGNOR TO TOLEDO SCALE COMPANY, OF TOLEDO, OHIO, A CORPORATION OF NEW JERSEY.

SCALE PLATFORM.

Application filed June 30, 1919. Serial No. 307,788.

*To all whom it may concern:*

Be it known that I, FREDERICK J. ENGLEN, a citizen of the United States, residing at Omaha, in the county of Douglas and State of Nebraska, have invented certain new and useful Improvements in Scale Platforms, of which the following is a specification.

This invention relates to improvements in weighing scales and more particularly to the platform mechanisms thereof.

To permit the weighings over an automatic scale to keep pace with the high speed production employed in many modern factories, or in weighing boxes, parcels, etc., as they are continuously brought to the scale over a conveyor system, efforts have long been directed to the provision of weighing mechanism that will serve to increase the number of weighings per minute or hour. The object of the present invention is to increase the number of weighings over a single scale in a given time by providing a platform mechanism arranged to permit the placing of a number of drafts on the platform at the same time. Thus, one draft can be placed on the platform and weighed, and the next draft can be placed on the platform simultaneously with the removal of the first draft therefrom, and so on. To facilitate the placing and removal of the drafts, the platform is arranged to rotate, whereby the loading and removal of the packages weighed can be continuously carried on from the same side of the scale, the platform being turned through a half revolution after each weighing.

A further object is to divide the platform into sections to clearly separate the parcels grouped in each weighing from those of any other weighing, and prevent confusion as to which parcels have been already weighed and should be removed.

A further object of this invention is to construct the rotatable platform as an attachment to an ordinary weighing scale, whereby scales now in use can be readily equipped with my improved platform mechanism.

With the above and other objects in view which will readily appear as the invention is better understood, my invention consists in the novel construction, combination, and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:

Figure 1 is a front elevation of an automatic scale equipped with my improved platform mechanism;

Figures 2 and 3 are detail plan views of parts to be hereinafter described;

Figure 4 is a perspective view of the supports for the rotatable platform adapted to be secured on the main platform; and Figure 5 is a side elevation of the rotatable platform in position on the main platform.

In the drawings, 5 designates the casing of the scale adapted to enclose the weighing or load-offsetting mechanism and supported upon a suitable column 6, the lower end of which rests on the scale base 7. The platform 8 is carried upon the platform-supporting lever mechanism, which is suitably mounted within the base 7 and connects with the weighing mechanism in the casing 5 through a steelyard rod or suitable intermediate mechanism extending through the column 6.

It will be understood that any suitable platform or platform lever mechanism may be employed in connection with the weighing mechanism of the scale, and the weighing mechanism herein shown is illustrated merely for the purpose of showing one application of an automatic scale wherein the present invention can be readily employed. The particular automatic scale herein shown has been found to successfully demonstrate the capabilities of the invention and employs a pendulum weighing mechanism including a pair of opposed pendulums adapted to be suitably connected with the platform lever mechanism through the medium of a hook rod 9 and so arranged and positioned that upon the placing of a load upon the scale platform the pendulums will be swung upwardly into a position counterbalancing the weight of the load on the platform, connection being made from the weighing mechanism whereby the upward movement of the pendulums will be transmitted to the indicating hand 10 through a rack meshing with a pinion on the shaft of the indicating hand. The hand 10 will be moved around the dial 11 in accordance with the extent of displacement of the pendulums, exhibiting to the operator the weight of the load on the platform. Inasmuch as the present invention is not dependent for its operation upon any particular form of weighing mechanism, no attempt is made in this application to show a complete scale mechanism nor to portray the action of the scale in its load-counterbalancing or weighing operations, only so much of an automatic weighing scale being shown as is necessary to clearly illustrate the operation and co-action of the claimed invention herein disclosed.

Mounted on the main or regular platform 8 of the scale is an auxiliary platform mechanism arranged to rotate as hereinafter described. The supports 12 for the auxiliary platform are preferably secured directly on the main platform 8 and are constructed of bent rods or angle irons, whereby they bring in alignment the openings 13 in each of the supports 12. Through these aligned openings 13 is mounted an upright central bolt 14 arranged to act as an axle upon which the rotatable auxiliary platform and the anti-friction elements hereinafter referred to revolve. Fixed upon the supports 12 is a circular track 15 forming the lower track of an anti-friction mechanism to permit the ready rotation of the auxiliary platform 16 when desired. To the bottom of the auxiliary platform 16 is preferably affixed an upper track 17 adapted to rest upon the peripheries of the anti-friction rollers 18, which in turn rest upon the lower track 15. The rollers 18 are preferably mounted at the outer ends of stub shafts 19, the inner ends of which are secured in a hub 20 (see Figure 2). It is understood, however, that other forms of anti-friction elements could also be used.

As herein shown, the hub 20 is apertured centrally to permit the passage of the bolt 14, which bolt extends through the bottom plate of the auxiliary platform 16, the hub 20 and the aligned openings 13 of the supports 12, lock nuts 14ᵃ being provided to hold the bolt against accidental displacement.

The rotatable platform 16 is preferably divided into sections to provide separate compartments into which the packages or articles to be weighed at a single weighing may be conveniently grouped. Thus, in the illustrated embodiment I have divided the auxiliary platform 16 into two compartments through the medium of a central dividing wall 21, riveted or otherwise secured to the platform, and to assist in retaining the packages or articles within each compartment I have provided outer walls 22, as clearly shown in Figures 1 and 5. With this construction I am enabled to place all of the articles desired to be grouped in a single weighing in the compartment on one side of the dividing wall 21, then after the weighing is effected, to rotate the auxiliary platform on the central bolt 14 so that the articles weighed can be removed by a workman on the opposite side of the scale, and the empty compartment is placed in position to receive the articles forming the next weighing, and so on.

The operation of my invention is believed to be apparent from the foregoing description. The platform is rotated through a half revolution after each weighing and the filled compartment is emptied at the same time as the empty compartment is being filled, thus enabling a considerable increase in the number of weighings over the scale in a given time.

All the parts of the auxiliary platform mechanism are mounted externally of the main platform and in such a manner as to permit the ready installation of my auxiliary platform mechanism on the platform of a scale in use.

While it will be apparent that the illustrated embodiment of my invention herein disclosed is well calculated to adequately fulfill the objects and advantages primarily stated, it is to be understood that the invention is susceptible to variation, modification and change without departing from the spirit and scope of the subjoined claims.

Having described my invention, I claim:

1. In a weighing scale, in combination, a plurality of platform supporting levers, a platform supported upon said levers and mounted to rotate thereon and adapted in each of its positions to support commodities for weighing, and means for dividing said rotatable platform into a plurality of commodity-receiving sections.

2. In a weighing scale, in combination, a plurality of platform supporting levers, intermediate supports carried by said levers, a platform rotatably mounted on said intermediate supports and adapted in all of its positions to support commodities for weighing, and means for dividing said platform into a plurality of commodity-receiving sections.

3. In a weighing scale, in combination, a plurality of platform supporting levers, intermediate supports carried by said levers, a platform rotatably mounted on said intermediate supports and adapted in all of its positions to support commodities for weighing, and an upstanding partition for dividing said platform into two commodity-receiving sections.

4. In a weighing scale, in combination, a main platform, an auxiliary commodity receiver rotatably mounted thereon, an upstanding partition dividing said auxiliary commodity receiver into a plurality of commodity-receiving parts, and anti-friction members arranged between the main platform and auxiliary commodity receiver.

5. In a weighing scale, in combination, a main platform, supports for an auxiliary commodity receiver mounted thereon, and an auxiliary commodity receiver superimposed upon said supports and pivotally connected thereto, said auxiliary commodity receiver having a partition secured thereto whereby it is divided into two parts.

6. A weighing scale having a main platform, supports mounted thereon, a lower track carried by said supports, anti-friction elements mounted to rotate on said lower track, an upper track resting upon said anti-friction elements, and an auxiliary platform secured to the upper track and adapted to rotate relatively to the main platform.

7. In a weighing scale, a main platform, supports mounted thereon, anti-friction elements mounted on said supports, an auxiliary platform mounted to rotate on said anti-friction elements, and a member arranged centrally of the auxiliary platform and connecting the platform with the supports.

FREDERICK J. ENGLEN.

Witnesses:
 JOHN VELEHRADSKY,
 G. E. GRAN.